(12) United States Patent
Okuda

(10) Patent No.: US 9,243,678 B2
(45) Date of Patent: Jan. 26, 2016

(54) IMPACT ABSORBING UNIT FOR A VEHICLE

(71) Applicant: TOYOTA SHATAI KABUSHIKI KAISHA, Aichi (JP)

(72) Inventor: Nobuhisa Okuda, Aichi (JP)

(73) Assignee: Toyota Shatai Kabushiki Kaisha, Aichi-Ken (JP)

(*) Notice: Subject to any disclaimer, the term of this patent is extended or adjusted under 35 U.S.C. 154(b) by 0 days.

(21) Appl. No.: 14/356,363

(22) PCT Filed: Nov. 21, 2012

(86) PCT No.: PCT/JP2012/080216
§ 371 (c)(1),
(2) Date: May 5, 2014

(87) PCT Pub. No.: WO2013/080863
PCT Pub. Date: Jun. 6, 2013

(65) Prior Publication Data
US 2014/0305757 A1 Oct. 16, 2014

(30) Foreign Application Priority Data

Nov. 29, 2011 (JP) .................................. 2011-259872
Dec. 2, 2011 (JP) .................................. 2011-264360

(51) Int. Cl.
*B60R 19/34* (2006.01)
*F16F 7/12* (2006.01)
*B60R 19/03* (2006.01)

(52) U.S. Cl.
CPC . *F16F 7/12* (2013.01); *B60R 19/03* (2013.01); *B60R 19/34* (2013.01)

(58) Field of Classification Search
USPC .................... 188/371, 377; 293/122, 132, 133
See application file for complete search history.

(56) References Cited

U.S. PATENT DOCUMENTS

| 3,380,557 | A | * | 4/1968 | Peterson | ........................ 188/374 |
| 3,721,433 | A | * | 3/1973 | Sobel | .............................. 267/140 |
| 3,887,223 | A | * | 6/1975 | Bez | ................................ 293/133 |
| 3,995,901 | A | * | 12/1976 | Filbert et al. | .................. 293/136 |
| 4,974,820 | A | * | 12/1990 | Nakanishi | ..................... 267/152 |
| 6,270,131 | B1 | * | 8/2001 | Martinez | ................ B60R 19/34 188/371 |
| 6,705,653 | B2 | * | 3/2004 | Gotanda | ................ B60R 19/34 293/132 |
| 6,932,201 | B2 | * | 8/2005 | Akiyama et al. | .............. 188/377 |
| 7,093,866 | B2 | * | 8/2006 | Toneatti | .................. B60R 19/34 293/121 |
| 7,389,860 | B2 | * | 6/2008 | Abu-Odeh et al. | ........... 188/377 |
| 7,926,865 | B2 | * | 4/2011 | Terada | .................... B60R 19/34 296/132 |
| 8,322,780 | B2 | * | 12/2012 | Nagwanshi et al. | ..... 296/187.03 |
| 2002/0101086 | A1 | * | 8/2002 | Koch et al. | ..................... 293/133 |
| 2009/0115208 | A1 | * | 5/2009 | Kano et al. | .................... 293/132 |
| 2009/0134643 | A1 | | 5/2009 | Alvarsson et al. | |
| 2011/0187135 | A1 | * | 8/2011 | Kano | ..................... B60R 19/34 293/133 |

(Continued)

FOREIGN PATENT DOCUMENTS

EP 2 055 983 5/2009
EP 2 647 868 10/2013

(Continued)

*Primary Examiner* — Christopher Schwartz
(74) *Attorney, Agent, or Firm* — Christensen Fonder P.A.

(57) ABSTRACT

An impact absorbing unit for a vehicle which is subjected to an axial compressive force from the impact in the event of a traffic collision, which includes a columnar piece of wood and a metallic housing covering lateral faces of the piece of wood. The housing has an uneven configuration formed in an outer surface or an inner surface, and the housing bulges outwards when subjected to an axial compressive force.

5 Claims, 12 Drawing Sheets

(56) References Cited

U.S. PATENT DOCUMENTS

| | | | |
|---|---|---|---|
| 2013/0306419 A1* | 11/2013 | Okuda | 188/377 |
| 2014/0124315 A1* | 5/2014 | Okuda | 188/376 |
| 2014/0346789 A1* | 11/2014 | Okuda | 293/122 |

FOREIGN PATENT DOCUMENTS

| | | |
|---|---|---|
| JP | 04-228376 A | 8/1992 |
| JP | 8-216916 A | 8/1996 |
| JP | 2001-182769 A | 7/2001 |
| JP | 2005-170082 A | 6/2005 |
| JP | 2009-056945 A | 3/2009 |
| JP | 2009-113596 A | 5/2009 |
| JP | 2009-528950 A | 8/2009 |
| JP | 2009-248744 A | 10/2009 |

* cited by examiner

IMPACT ABSORBING UNIT FOR A VEHICLE

PRIORITY CLAIM

The present application is a National Phase entry of PCT Application No. PCT/JP2012/080216, filed Nov. 21, 2012, which claims priority from Japanese Patent Application No. 2011-259872, filed Nov. 29, 2011 and Japanese Patent Application No. 2011-264360, filed Dec. 2, 2011, the disclosures of which are hereby incorporated by reference herein in their entirety.

BACKGROUND OF THE INVENTION

1. Field of the Invention

The present invention relates to an impact absorbing unit for a vehicle, and more particularly to an impact absorbing unit for a vehicle having a columnar piece of wood and a metallic housing covering the lateral faces of the wood. This impact absorbing unit is typically subjected to an axial compressive force due to the impact in the event of a traffic collision.

2. Description of the Related Art

For example, Japanese Laid-open Patent Application Publication No. 2001-182769 discloses art relating to the impact absorbing unit mentioned above. The impact absorbing unit is subjected to a compressive force that is caused by an impact. According to the publication, a piece of wood fitted in an aluminum hollow square tube with a small gap can reduce fluctuation of the compressive force (or the resistive force during the deformation) to provide improved impact-energy absorption capacity. Furthermore, matching the direction of the wood grain to the axis of the housing can provide an increase in the amount of impact energy absorbed.

SUMMARY OF THE INVENTION

Wood, by nature, has a porous structure and a grain aligned in a certain direction. When a piece of wood is compressed straight while its grain direction is matched with the direction of compression, then the compressive force variation will be effectively reduced and the impact energy absorption can be improved. The housing collapses through a bellows-like deformation to form corrugations. When the bellows-like corrugations have a large depth, the inwardly bent housing bites into the wood, causing part of the wood to have an inclined grain direction with respect to the axis. In this way, the wood cannot make the most of its natural performance. Specifically, the partially inclined grain leads to a large fluctuation in its compressive force. The more tightly the housing holds the piece of wood, the more easily the housing can bite deeply into the wood thereby causing the wood grain to slope at an angle.

One aspect of the invention provides an impact absorbing unit for a vehicle which includes a columnar piece of wood and a metallic housing covering lateral faces of the piece of wood and which receives an axial compressive force from the impact in the event of a traffic collision. The housing has an uneven configuration formed in the outer or inner surface, and a cross-section of the housing, taken perpendicular to the axis of the piece of wood, bulges outwards (i.e. away from the lateral faces of the wood) when subjected to an axial compressive force. In a preferred embodiment, the housing may have a plurality of concavities formed in the outer surface. In another preferred embodiment, the housing may have ribs protruding from its walls. As a result, the axially collapsing housing is more difficult to bite into the piece of wood, and thereby the wood can fully exert its intrinsic performance.

DETAILED DESCRIPTION OF THE INVENTION

Embodiment 1

Figure 1:
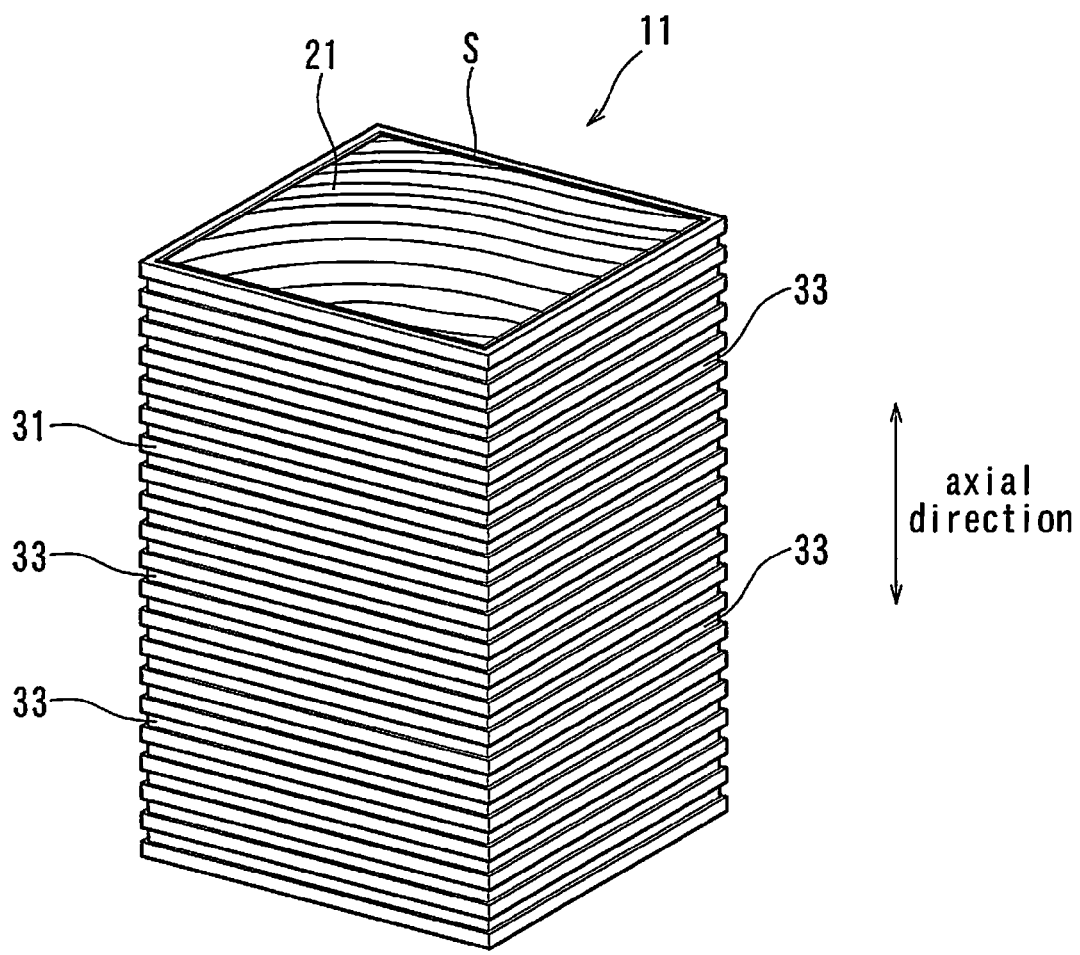
FIG. 1 is a perspective view of an impact absorbing unit according to Embodiment 1 of the invention.
Figure 2:
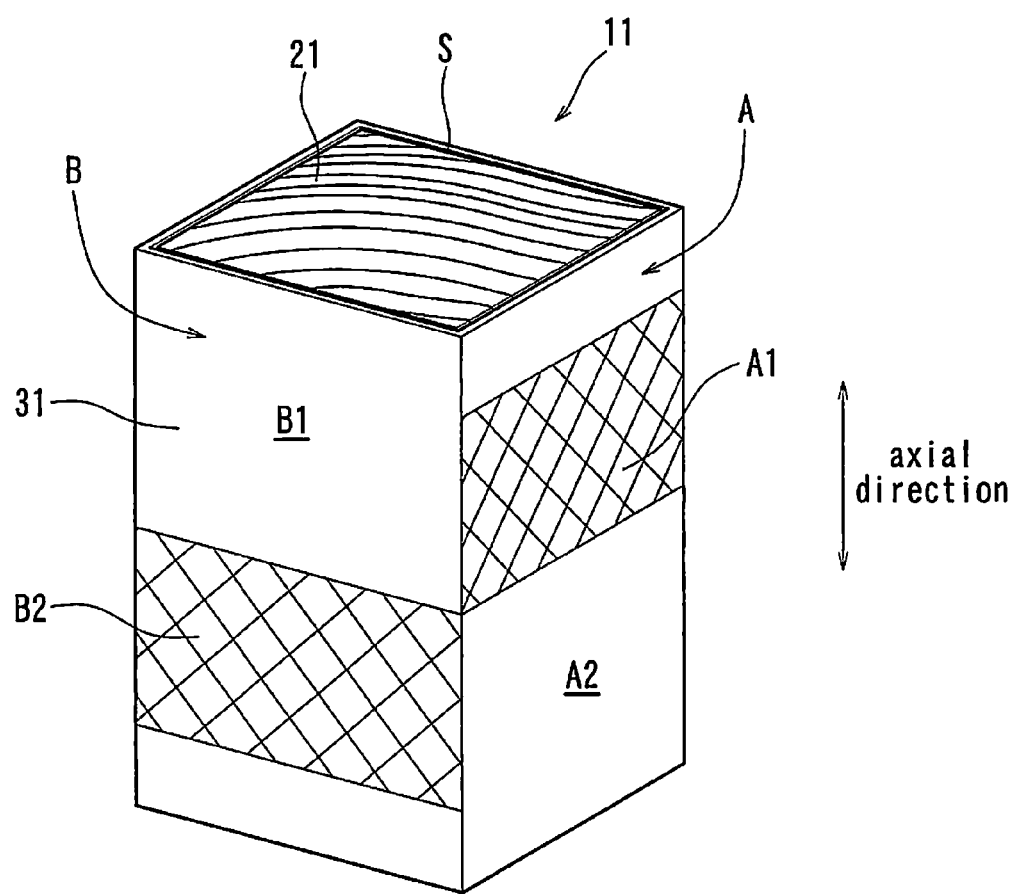
FIG. 2 is a perspective view of the impact absorbing unit according to Embodiment 1 of the invention, schematically illustrating a deformation mode of the housing that constitutes the impact absorbing unit.

An embodiment of the invention will be described with reference primarily to FIGS. 1 and 2. An impact absorbing unit 11 according to the present embodiment may be installed in an automobile or other vehicle and absorbs impact energy in the event of a traffic collision. As shown in FIG. 1, the impact absorbing unit 11 may include a columnar piece of wood 21 with a square cross-section taken perpendicular to the axis, and a metal housing 31 that covers lateral faces of the wood 21. The impact absorbing unit 11 can be subjected to an axial compressive force from the impact in the event of a traffic collision.

The piece of wood 21 may be provided by trimming wood into a columnar shape such that the grain of the wood 21 is oriented parallel to the direction of the compressive force that can be applied, i.e. the axis of the piece of wood 21. The kind of wood to form the piece of wood 21 is not particularly limited. For example, conifers, such as cedar, Japanese cypress and pine, or broad-leaved trees, such as zelkova and beech can be used.

The housing 31 may be formed in a hollow square tube with four walls. The housing 31 can support the piece of wood 21, and, when subjected to an axial compressive force, can deform together with the wood 21. The housing 31 may be made of soft metals, such as aluminum and copper. The piece of wood 21 is accommodated inside the housing 31 with a slight gap S between the housing 31 and the wood 21. The lateral faces of the wood 21 may be covered without excess or insufficiency by the housing 31. The housing 31 has a number of grooves 33 formed in the outer surface. The grooves 33 may be oriented perpendicular to the axis, continuously around the entire circumference of the housing 31, and/or arranged over the entire length, forming a striped pattern. The cross-sectional shape of the groove 33 is not particularly limited, and can be U-shaped, V-shaped, rectangular, or semi-circular.

The operation of the impact absorbing unit 11 where the compressive force applied during a traffic collision will now be described. The impact absorbing unit 11 is installed in a vehicle in such a manner that the axis (i.e. the grain direction) of the piece of wood 21 is oriented parallel to a possible direction of collision. When the axial compressive force caused by a traffic collision is exerted on the impact absorbing unit 11, the housing 31 prevents leaning of the piece of wood 21 so that the wood 21 is compressed straight along the axis. The housing 31 that wraps the wood 21 buckles to collapse without shifting its axis.

Since the grooves 33 are formed on only the outer surface of the housing 31, the housing 31 can more easily bend outwards than inwards to form a bulge. All the walls that constitute the housing will expand, resulting in the adjacent walls alternately folded outwards while being compressed along the axis (see FIG. 7). In this process, the parts of the housing that will not bend outwards are hardly deformed. To better understand this deformation mode, the regions that can bend outwards in the impact absorbing unit 11 are indicated in cross-hatching in FIG. 2 in an extremely rough manner. When an area A1 in the length of the wall A of the housing 31 bends outwards, then an adjacent area B1 in the wall B does not deform. An area B2 that is adjacent to the area B1 in the length of the wall B bends outwards, while an adjacent area A2 in the wall A does not deform. If no grooves 33 are formed in the housing 31, the walls would have no difference in terms of the relative ease of bending between outward and inward bending. When the area A1 in the wall A bend outwards, then the area B1 in the wall B that is adjacent to the area A1 would bend inwards in order to offset the strain. In the present embodiment, however, the impact absorbing unit 11 has grooves 33 formed over the outer surface of the housing 31, so all the walls can easily bend outwards rather than inwards. In addition, the grooves weaken the housing 31, and thus the housing 31 is not so hard that it can bite into the wood 21. As a result, the area B1 in the wall B that is adjacent to the area A1, unable to bend inwards or outwards, remains hardly deformed, even though the area A1 in the wall A bends outwards.

In the impact absorbing unit 11 described above, when subjected to an axial compressive force, the housing 31 that covers the wood 21 is crushed while keeping its axis unchanged, so the piece of wood 21 can be compressed straight in the grain direction without slanting. Accordingly, the compressive force variation that results from the resistance is small. When collapsing, the housing 31 bends outwards and not inwards, so the housing 31 is difficult to bite into the wood 21 causing part of the grain to angle. As a result, the compressive force variation that is caused by grain inclination is hardly induced. A gap S between the housing 31 and the wood 21 also contributes to preventing the housing 31 from biting into the wood 21. However, no gap S may possible because the housing 31 which chiefly deforms outwards is not likely to interfere with the wood 21. A very slight gap S also enhances the biting-in suppression effect, ensuring that the housing 31 keeps the piece of wood 21 in the straight position. The size of the gap S may preferably be 1 mm or less, and more preferably 0.5 mm or less.

The installation location for the impact absorbing unit 11 is not particularly limited as long as it is suitable for absorbing the impact energy to protect occupants and pedestrians. The impact absorbing unit 11 may be installed somewhere, for example, between the fender panel and the body panel, between the bumper reinforcement and the side frame member, between the door panel and the door trim, between the pillar and the pillar trim, between the roof panel and the roof liner, or between the floor panel and the carpet. The means of fixing the impact absorbing unit 11 into the vehicle is not particularly limited. The housing 31 may be fixed to the vehicle by welding or by binding with adhesives, or using a bracket.

Embodiment 2

Figure 3:
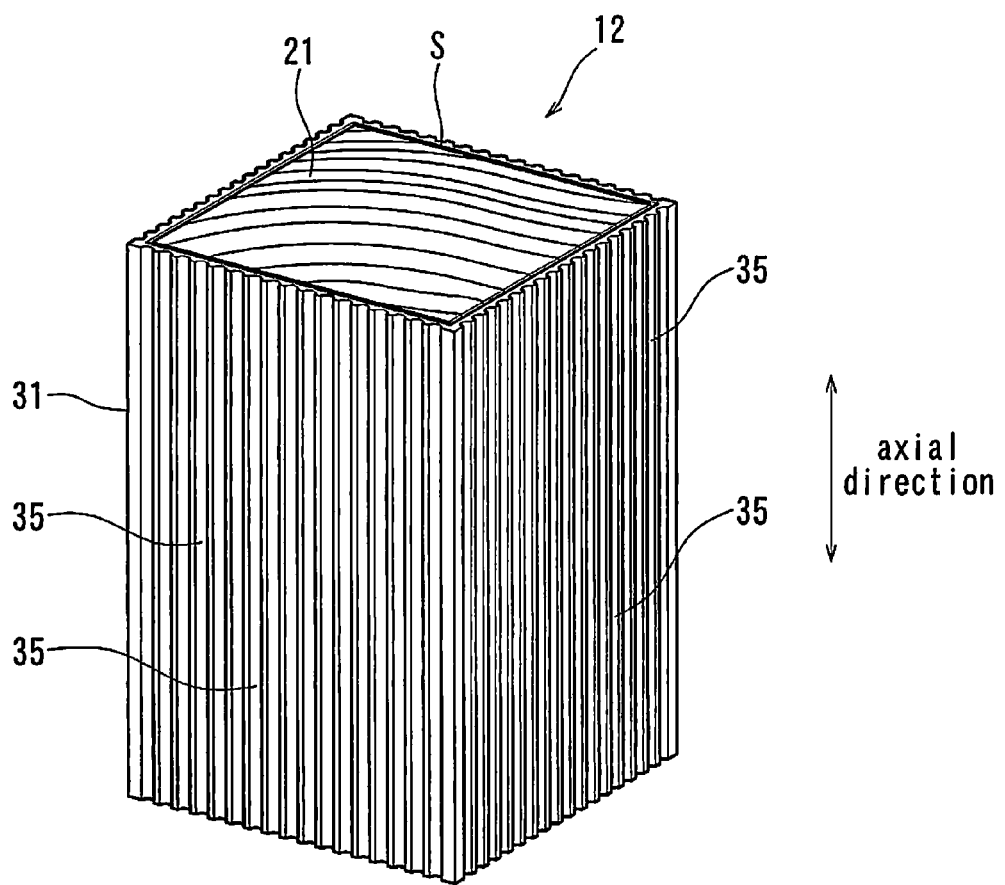
FIG. 3 is a perspective view of an impact absorbing unit according to Embodiment 2 of the invention.

Another embodiment of the invention will be described with reference to FIG. 3. An impact absorbing unit 12 in Embodiment 2 is similar to the impact absorbing unit 11 of Embodiment 1 in that both comprise a columnar piece of wood 21 and a metallic housing 31 that covers the lateral face of the wood 21. In the present embodiment, however, the shape of the outer surface of the housing 31 is different from that in Embodiment 1. The elements that are not changed from those in Embodiment 1 are provided with the same reference numerals in the drawings, and will not be described in detail again.

In Embodiment 2, the housing 31 has a plurality of grooves 35 parallel to the axis formed in the outer surface. Each groove 35 may be continuously formed from end to end of the walls along the axis. The grooves 35 may be arranged over the entire surface of the walls of the housing 31, forming a striped pattern. The cross-sectional shape of the groove 35 is not particularly limited but can be, for example, U-shaped, V-shaped, rectangular or semi-circular.

When the impact absorbing unit 12 is subjected to an axial compressive force, the housing 31 buckles in the middle of the length, where the entire periphery bulges into a rounded form, widening the grooves 35, and then the housing 31 collapses without shifting of its axis. In addition, the housing 31 prevents the flexure of the inside wood 21 so that the wood 21 can be compressed straight along the axis. Since the housing 31 bends chiefly outwards when collapsing, the housing 31 is difficult to bite into the wood 21. As a result, the compressive force variation that is due to the partial inclination of the wood grain is not likely to be induced.

Advantageous Effects of the Embodiments

In Embodiments 1 and 2 described above, the impact absorbing unit includes a columnar piece of wood 21 and a metallic hollow tube housing 31 that covers the lateral faces of the wood 21. This impact absorbing unit 11 is subjected to an axial compressive force from the impact caused during a traffic collision. A plurality of concavities is formed in the outer surface of the housing 31, so the entire outer surface has an uneven configuration. The concavity may preferably comprise grooves 33, 35 that may be perpendicular or parallel to the axis having stripes.

In an embodiment described above, the housing 31 may have a plurality of concavities formed in the outer surface so that the housing 31 can easily be bent outwards rather than inwards. Since the housing 31 collapses straight along the axis by chiefly bulging outwards, it is difficult for the housing 31 to bite into the wood 21, and thus it is possible to accurately exert an intrinsic property of the wood.

While embodiments of the invention are described with reference to aspects as described above, it should be understood by those skilled in the art that various substitutions, modifications and alterations may possible without departing from the scope of the invention. Thus, embodiments of the invention can include various substitutions, modifications and alterations as long as they do not depart from the spirit and scope of the appended claims. Embodiments of the invention are not limited to the particular aspects described above and can be changed as follows.

The impact absorbing unit may be shaped in the form of a rectangular column which has a rectangular cross-section that is perpendicular to the axis. Alternatively, the impact absorbing unit may be shaped in the form of any other polygonal column, or even a cylindrical shape. Furthermore, various forms are possible for the concavity formed in the outer surface of the housing, as long as the housing can bend outwards more easily rather than inwards when subjected to an axial compressive force. The concavity is not limited to a linear concavity or groove but may be, for example, a number of dimples scattered over the outer surface. The groove-shaped concavity is not limited to separate grooves, but may be, for example, a thread-like or helical groove that is continuous around the outer surface of the housing, which makes it easier to produce the groove. The grooves are not limited to ones arranged in parallel, but may be, for example, arranged in a lattice in which the grooves intersect each other.

EXAMPLES

In the following, an evaluation of impact-energy absorption capacity will be described using specific examples according to Embodiments 1 and 2, although the invention is not limited to these examples.

As examples for evaluation, two impact absorbing units of Examples 1 and 2 were prepared. The impact absorbing units had concavities of different patterns formed in the outer surface of the housing. The Example 1 impact absorbing unit had grooves perpendicular to the axis formed in the outer surface of the housing, based on Embodiment 1 as described above. The Example 2 impact absorbing unit had grooves parallel to the axis formed in the outer surface of the housing, based on Embodiment 2 described as above. In addition, an impact absorbing unit of Reference 1 was also prepared for the sake of comparison. The impact absorbing unit of Reference 1 had no concavity formed in the outer surface of the housing. In the impact absorbing units of Examples 1 and 2 and Reference 1, the piece of wood was made from a square timber of cedar and sized 39.3 mm square in external size and 70 mm in axial length. The housing was made of a hollow square tube of A5052 aluminum sized 42 mm square in external size, 70 mm in axial length, and 1 mm in thickness. The form of the grooves that were formed in the outer surfaces of the housings of Examples 1 and 2 was as follows.

Form of Grooves of Example 1

Extends: perpendicular to axis
Shape of cross section: rounded V-shaped
Size of grooves: 0.5 mm in width, 0.5 mm in depth
Intervals between grooves: 2 mm (with 34 grooves in total)

Form of Grooves of Example 2

Extends: parallel to axis
Shape of cross section: rounded V-shaped
Size of grooves: 0.5 mm in width, 0.6 mm in depth
Intervals between grooves: 0.5 mm (with 41 grooves in each wall)

Figure 4:
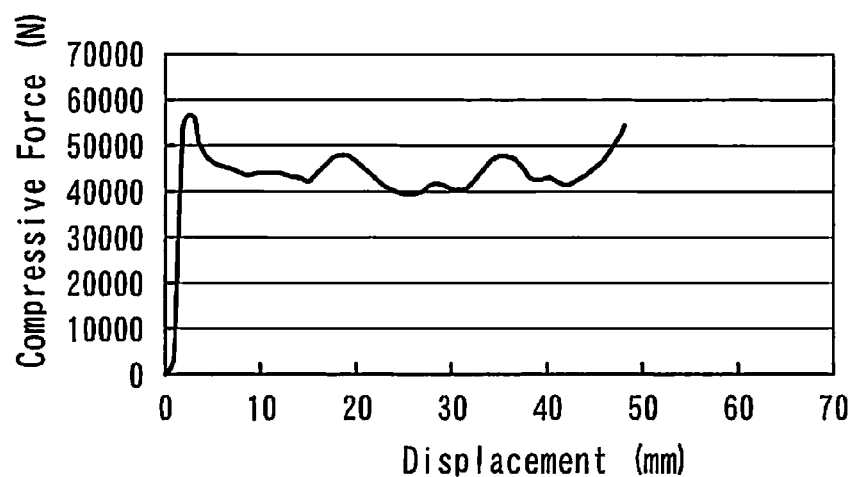
FIG. 4 is a chart showing the change of compressive force versus compressive length of an impact absorbing unit of Example 1.
Figure 5:
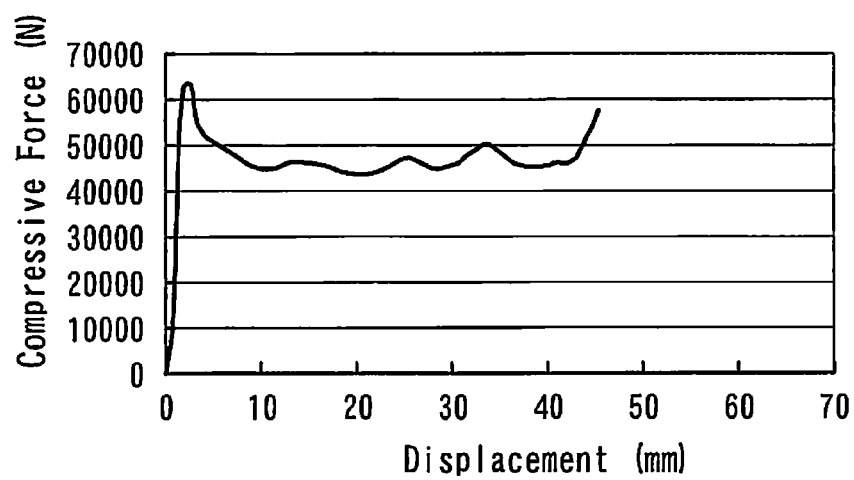
FIG. 5 is a chart showing the change of compressive force versus compressive length of an impact absorbing unit of Example 2.
Figure 6:
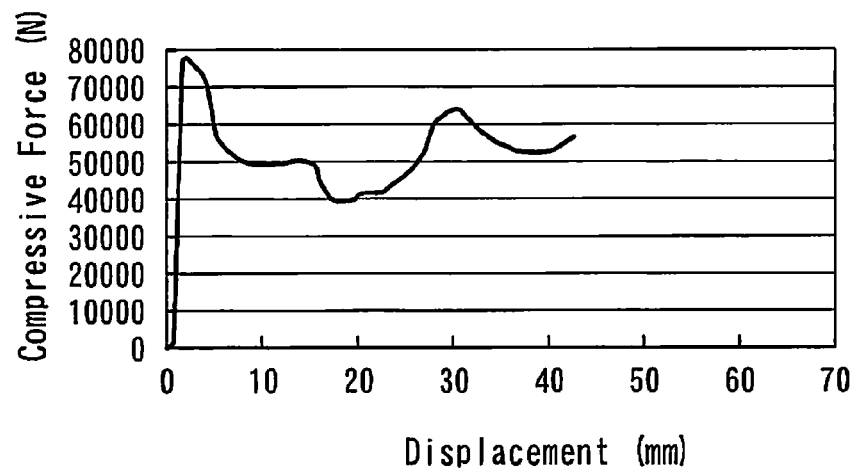
FIG. 6 is a chart showing the change of compressive force versus compressive length of an impact absorbing unit of Reference 1.

Each impact absorbing unit made as specified above was mounted on a compression testing machine (Autograph AG-100KNE, Shimadzu Corporation), and a relation between the compressive deformation and the compressive force was measured while an axial compressive force was being applied to provide a compression rate of 2 mm/min. The measurement results are shown in FIGS. 4 to 6. The impact absorbing units in a compressed condition are shown in photographs in FIGS. 7 to 9.

Figure 7:
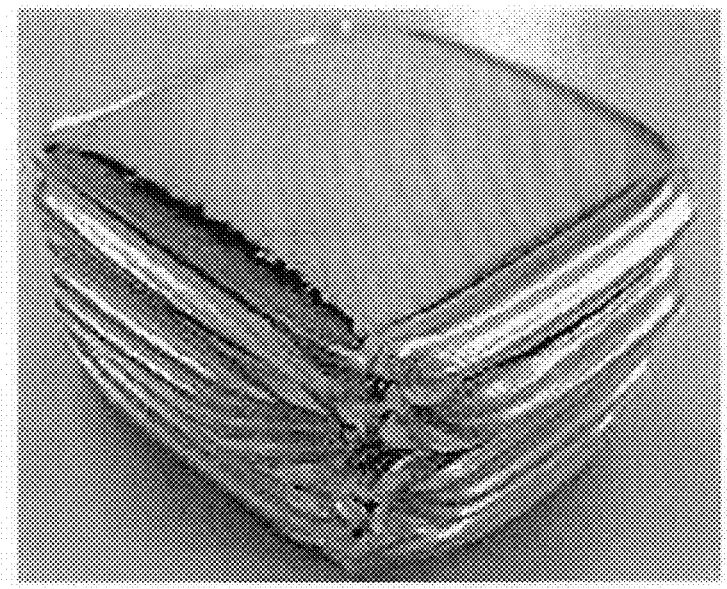
FIG. 7 is a photograph of the impact absorbing unit of Example 1, showing the appearance after compression viewed obliquely.
Figure 8:
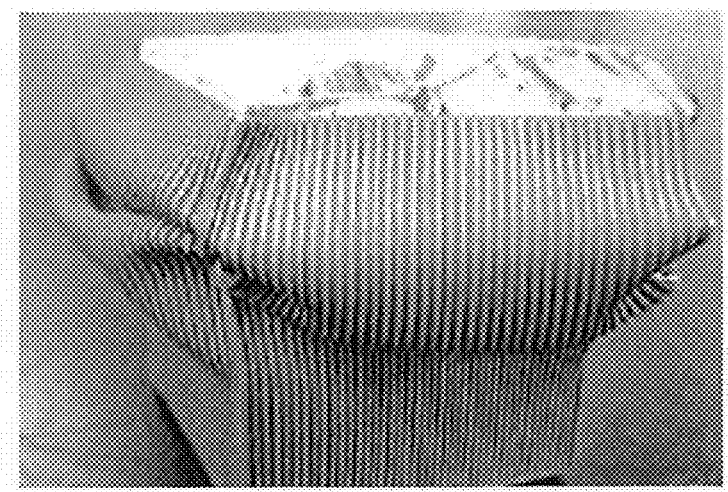
FIG. 8 is a photograph of the impact absorbing unit of Example 2, showing the appearance after compression viewed obliquely.
Figure 9:
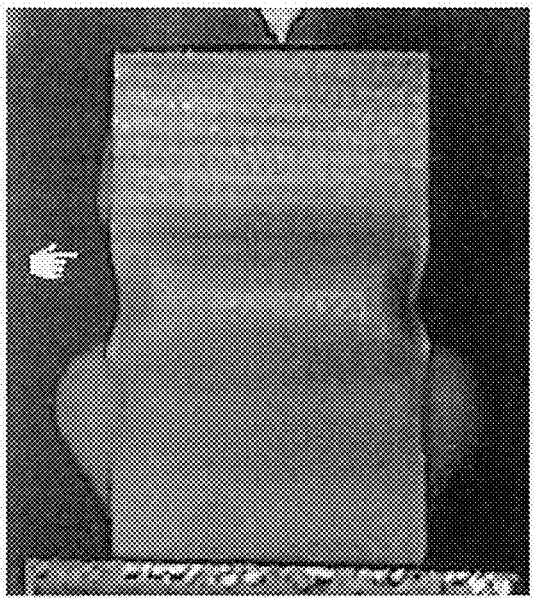
FIG. 9 is a photograph of the impact absorbing unit of Reference 1, showing the appearance during compression viewed from the front.
Figure 10:
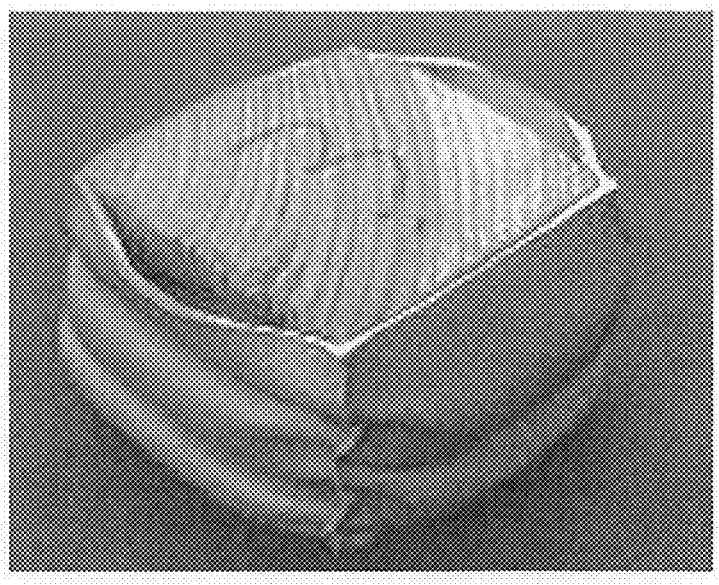
FIG. 10 is a photograph of the impact absorbing unit of Reference 1, showing the appearance after compression viewed obliquely.

Referring to the charts of FIGS. 4 to 6 which show the relation between deformation of the impact absorbing unit and compressive force. It is clearly seen that after the rise at the initial deformation, the compressive force progressed with less variation in Examples 1 and 2 (which had concavities in the housing outer surface) than Reference 1 (which had no concavities provided). In terms of deformation of the impact absorbing unit, the inside wood was compressed without inclination in any of Example 1, Example 2 or Reference 1. On the other hand, the outer-side housings can be deformed in different ways. In the case of Example 1, as shown in FIG. 7, the housing, which had grooves perpendicular to the axis in the outer surface, collapsed forming a number of outward ridges alternately in the adjacent walls of the housing. The housing did not bend inwards to bite into the wood. In the case of Example 2, as shown in FIG. 8, the housing, which had grooves parallel to the axis in the outer surface, collapsed such that in the middle of the length of the housing all the walls expanded forming bulges. The housing did not bend inwards to bite into the wood. Contrastingly, as shown in FIGS. 9 and 10 the housing of Reference 1, which had no concavities in the outer surface, collapsed into a bellows-like form with corrugations that bend alternately inwards and outwards. This results in the interference of the inwardly bent housing with the wood. It is clearly seen from this result that when the housing has any concavities in the outer surface such that the housing can easily bend outwards rather than inwards, the housing biting into the wood will be effectively prevented and thus the intrinsic property of the wood can be assuredly exerted to stabilize the compressive force.

Embodiment 3

Figure 11:
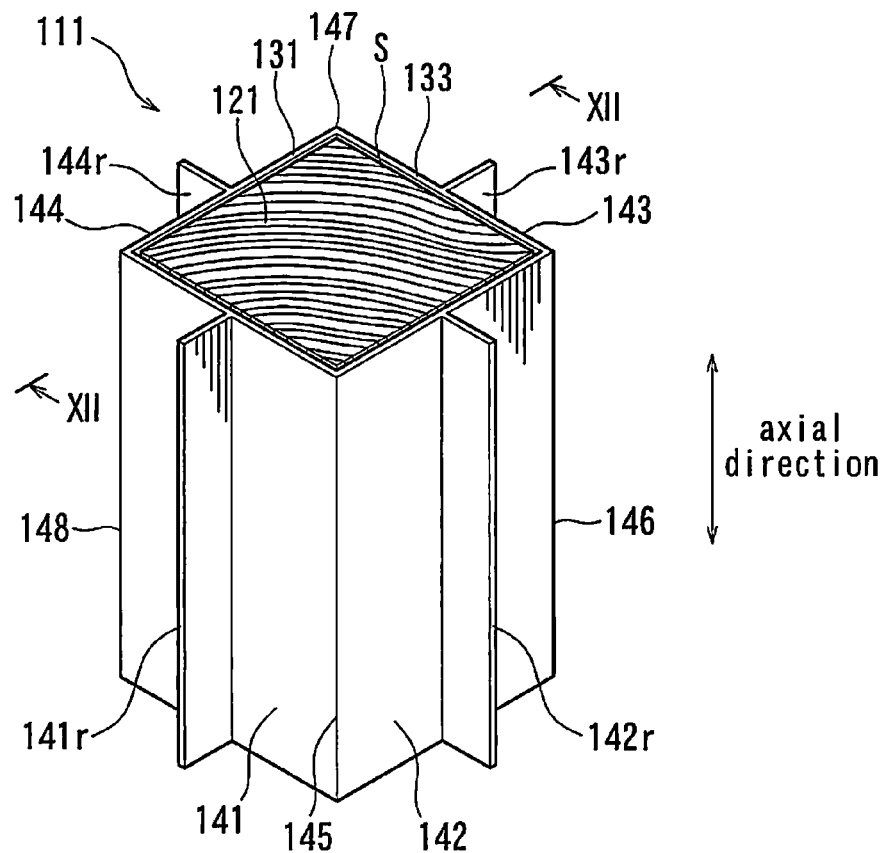
FIG. 11 is a perspective view of an impact absorbing unit according to Embodiment 3 of the invention.
Figure 12:
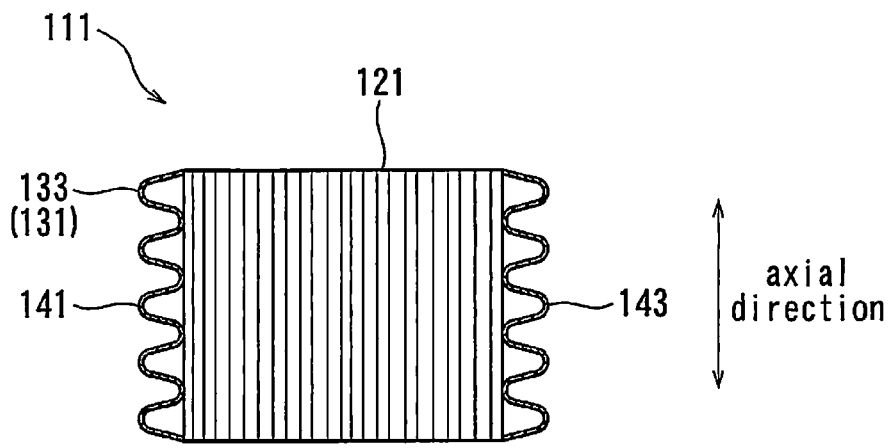
FIG. 12 is a cross-sectional view of the impact absorbing unit of FIG. 11 taken along the line XII-XII, schematically showing the state after compression.
Figure 13:
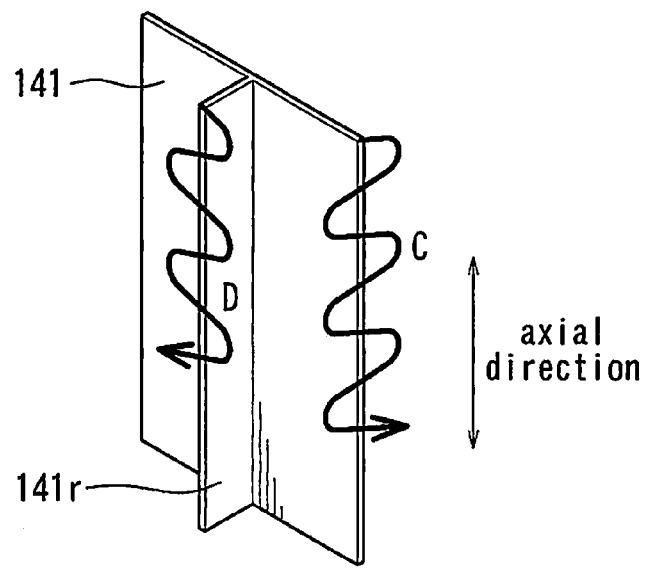
FIG. 13 is a view of part of the housing that constitutes the impact absorbing unit according to Embodiment 3 of the invention, schematically showing a deformation mode of the housing.

Another embodiment of the invention will be described with reference to FIGS. 11 to 13. An impact absorbing unit 111 of this embodiment may be installed in an automobile or other vehicles for absorbing impact energy caused by a traffic collision. As shown in FIG. 11, the impact absorbing unit 111 may be composed of a columnar piece of wood 121 with a square cross-section that is taken perpendicular to the axis, and a metallic housing 131 covering the lateral faces of the piece of wood 121. The impact absorbing unit 111 is subjected an axial compressive force from the impact caused by the traffic collision.

The piece of wood 121 is trimmed into a columnar shape such that the direction of the grain in the wood 121 is parallel to a direction of the compressive force (that is the axis). The kind of wood that forms the piece of wood 121 is not particularly limited. For example, conifers, such as cedar, Japanese cypress and pine, or a broad-leaved trees, such as zelkova and beech can be used. Woods with a high specific gravity are excellent in hardness. Woods with a lower specific gravity are excellent in porosity, so the crush length (amount of compressive deformation) will be extended. This point should be taken into consideration when selecting the kind of wood with a suitable specific gravity according to the installation location in the vehicle. Wood with a specific gravity of 0.2 to 0.4 is preferably used, because it has a moderate hardness while ensuring an adequate crush length, whereby the impact energy absorption is enhanced. Woods with a specific gravity of 0.2 to 0.4 include, for example, cedar, Japanese cypress, pine.

The housing 131 includes a hollow square-tube frame portion 133 having four walls 141-144 opposite the lateral faces of the piece of wood 121. The housing 131 can support the piece of wood 121 and, when subjected to an axial compressive force, can be deformed together with the piece of wood 121. The housing 131 may be made of metals such as aluminum, copper and iron. The piece of wood 121 is accommodated in the frame portion 133 with a slight gap S between the frame portion 133 and the lateral faces of the piece of wood 121. The lateral faces of the wood 121 may be covered without excess or insufficiency by the frame portion 133.

The four constituent walls 141-144 of the frame portion 133 are provided with ribs 141r-144r. The ribs 141r-144r are shaped in the form of plates that extend away from the walls 141-144 at right angles. The ribs 141r-144r are located in the middle of the width of the walls 141-144 and extend the entire length of the walls 141-144 along the axis. The height (or length of projection) of the protruding ribs 141r-144r may be constant over the entire length. When subjected to an axial compressive force, the ribs 141r-144r, while buckling themselves, do not prevent the walls 141-144 of the frame portion 133 from buckling to form corrugations. How these ribs 141r-144r specifically work will be described below, in connection with the operation of the impact absorbing unit 111 when subjected to a compressive force created during a traffic collision.

The impact absorbing unit 111 is installed in a vehicle such that the axis (that is the grain direction) of the piece of wood 121 is oriented parallel to the direction of the vehicle collision. When the impact absorbing unit 111 is subjected to an axial compressive force caused by collision, as schematically illustrated in FIG. 12, the frame portion 133 of the housing 131 which covers the piece of wood 121 buckles to collapse along the axis into a bellows-like form. Furthermore, the housing 131 prevents leaning of the wood 121 so that the wood 121 can be compressed straight along the axis.

In this process, each rib 141r-144r buckles to form corrugations with bends directed perpendicular to the bending direction of the corresponding wall 141-144. The deformation mode of the ribs 141r-144r will be described referring to FIG. 13, focusing on only one wall 141 as shown on the left side in FIG. 11. While the wall 141 buckles to form corrugations that bend towards the inside/outside of the frame portion 133 as indicated with the arrow C, the rib 141r buckles along the axis to form corrugations deviating perpendicular to the bending direction of the wall 141 as indicated with the arrow D. The deformation of the frame portion 133 generally begins with the buckling of the relatively rigid corners 145-148. The flat walls 141-144 which extend between the corners would then bend to form corrugations; however, in the middle of the width, the walls 141-144 are prevented from bending so much as to deform into a bellows-like form because the ribs 141r-144r on the walls are compressed along the axis such that they wrinkle. The ribs 141r-144r as well as the corners serve as nodes of the bellows-like deformation, and the corrugations formed in the walls 141-144 are divided by the ribs 141r-144r as the boundary. In other words, the walls 141-144 have separate groups of corrugations in each of the narrower areas divided by the ribs 141r-144r. The narrower areas on the either side of the ribs pull against each other when buckling, so the narrow areas are prevented from great bending, resulting in smaller height corrugations formed in each narrow area.

To effectively subdivide the corrugations in the walls 141-144, the ribs 141r-144r are designed to have an appropriate protrusion height and thickness such that the ribs 141r-144r can buckle and collapse along the axis when subjected to a compressive force. In this case, the ribs 141r-144r preferably do not entirely reinforce the walls 141-144 so as to prevent the bellows-like deformation of the walls 141-144, although the ribs 141r-144r may actually reinforce the walls 141-144 to some extent. In addition, the ribs 141r-144r are preferably not so weak as to have inward/outward distortion, yielding to the walls 141-144 that bend inwards/outwards. Each of the ribs 141r-144r may preferably have a protrusion height to thickness ratio (height-to-thickness ratio) within the range of 5:1 to 120:1. With such a height-to-thickness ratio, the ribs 141r-144r subjected to the compressive force can buckle to bend towards the front and back of its plate shape, and thereby the bellows-like corrugations in the walls 141-144 can be effectively divided into smaller ones. As long as the height-to-thickness ratio is within the range described above, the thickness of the ribs 141r-144r may generally be, for example, 5 mm or less. Such a thickness is well balanced with the protrusion height, so the corrugations in the walls 141-144 are effectively divided into smaller ones.

In the impact absorbing unit 111 described above, when subjected to an axial compressive force, the frame portion 133 of the housing 131 which covers the piece of wood 121 collapses along the axis through the bellows-like deformation. This prevents the piece of wood 121 from bending so that the piece of wood 121 is compressed straight in the direction of the wood grain. Accordingly, a compressive force variation that results from the resistance is small. The frame portion 133 of the housing 131 deforms in a bellows-like form with lower corrugations, and thus does not bend inwards so greatly. The frame portion 133 is difficult to bite into the wood 121 causing part of the grain to incline. As a result, the compressive force variation that is due to the grain inclination is hardly induced. A gap S between the housing 131 and the wood 121 also contributes to preventing the housing 131 from biting into the wood 121. Since it is difficult to effectively bend the frame portion 133 of the housing 131 inwards, even a very slight gap S is possible to enhance the biting-in suppression effect, ensuring that the frame portion 133 can hold the piece of wood 121 straight. The size of the gap S may preferably be 1 mm or less, and, more preferably, 0.5 mm or less. The lower limit of the size of the gap S is not particularly limited. No gap S may be possible because in the impact absorbing unit 111 in the present embodiment, the housing is prevented from biting into the wood basically by the deformation of the housing into smaller corrugations.

The installation location for the impact absorbing unit 111 is not particularly limited as long as it is suitable for absorbing the impact energy to protect occupants and pedestrians. For example, the impact absorbing unit 111 may be installed somewhere between the fender panel and the body panel, between the bumper reinforcement and the side frame member, between the door panel and the door trim, between the pillar and the pillar trim, between the roof panel and the roof liner, or between the floor panel and the carpet. The means of fixing the impact absorbing unit 111 to the vehicle is not particularly limited. The housing 131 may be fixed to a vehicle by welding or binding with adhesives, or using a bracket.

Embodiment 4

Figure 14:
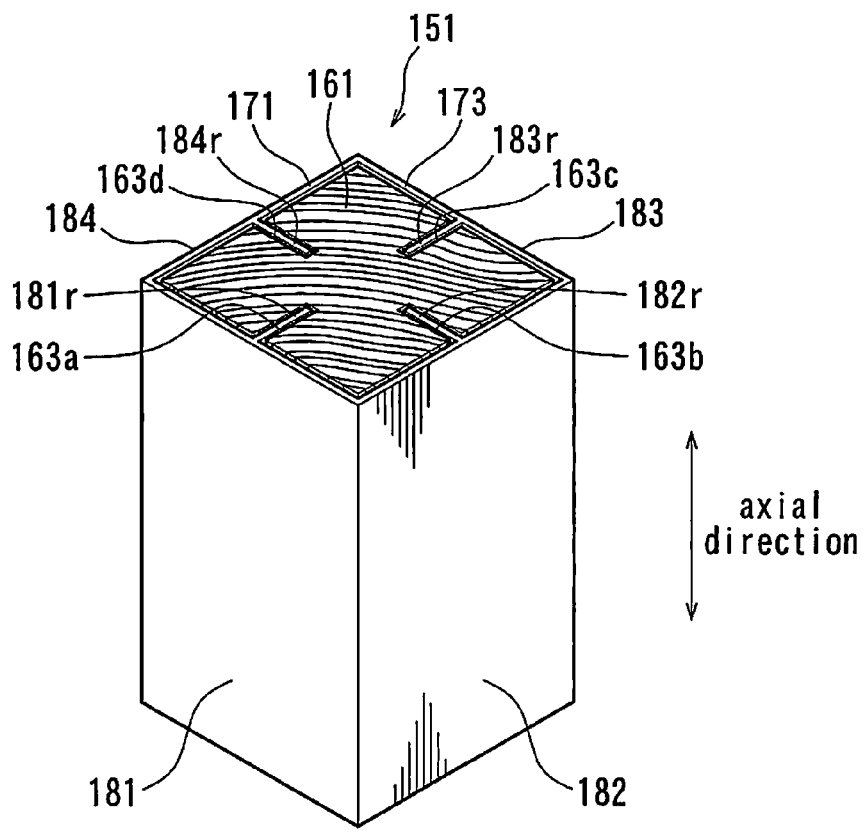
FIG. 14 is a perspective view of an impact absorbing unit according to Embodiment 4 of the invention.

Another embodiment of the invention will be described with reference to FIG. 14. In this embodiment the impact absorbing unit 151 is a component which is installed in an automobile or other vehicles, and receives an axial compressive force from the impact caused by a traffic collision. The impact absorbing unit 151 has a columnar piece of wood 161 and a housing 171 which is formed of metal and covers lateral faces of the wood 161. The impact absorbing unit 151 will operate in the same way as that in Embodiment 3, but differs in configuration from the impact absorbing unit of Embodiment 3 in that inwardly extending ribs 181r-184r are formed in the housing 171.

The piece of wood 161 is trimmed into a columnar shape such that the grain direction of the wood 161 is parallel to the compressive force (or the axis). The wood 161 has slits 163a-163d formed in each lateral face, in which the ribs 181r-184r of the housing 171 are fitted.

The housing 171 includes a frame portion 173 which is formed in a hollow square tube shape. The four constituent walls 181-184 of the frame portion 173 are provided with plate-like ribs 181r-184r projecting inwards at right angles. The ribs 181r-184r are located in the middle of the width of the walls 181-184 and extend the entire axial length of the walls 181-184. The heights (or lengths of projection) of the respective protruding ribs 181r-184r are constant over the entire length. The housing 171 is accommodated in the piece of wood 161, with the ribs 181r-184r inserted into the respective slits 163a-163d in the wood 161. The lateral faces of the piece of wood 161 may be covered without excess or insufficiency by the frame portion 173.

When subjected to an axial compressive force, the ribs 181r-184r themselves are buckled and crushed along the axis. Furthermore, the ribs 181r-184r allow the walls 181-184 of the frame portion 173 to buckle so as to be deformed in a corrugated form. The height of the protruding ribs 181r-184r may be appropriately altered within such a range as not to section the wood 161. If the wood 161 is separated by the ribs 181r-184r, the pieces of wood 161 would be more easily bent when axially compressed. The ribs 181r-184r may preferably have a height-to-thickness ratio within the range of 5:1 to 20:1. Such a height-to-thickness ratio is effective to divide the bellows-like corrugations in the walls 181-184 into smaller ones. As long as the height-to-thickness ratio is within the range mentioned above, the thickness of the ribs 181r-184r is not particularly limited but generally the thickness may be equal to or less than, for example, 5 mm. Such a thickness is well balanced with the protrusion height, so the corrugations in the walls 181-184 can be effectively divided into smaller ones.

Advantageous Effects of Embodiments

In Embodiments 3 and 4 described above, the impact absorbing unit includes a columnar piece of wood and a hollow tube metallic housing that covers the lateral faces of the wood. This impact absorbing unit receives an axial compressive force from the impact caused by the traffic collision. The housing has ribs that protrude at right angles from at least a pair of opposite faces and extend the entire axial length of the housing.

In this configuration, the ribs decrease the height of the folds formed in the housing during deformation into a bellows-like form upon being subjected to an axial compressive force. Accordingly, it is possible to prevent the housing from biting into the wood.

The ribs may preferably have a ratio of protrusion height to thickness (hereinafter referred to as height-to-thickness ratio) within the range from 5:1 to 20:1. This design effectively decreases the height of the folds formed in the housing that is deformed in a bellows-like form. Thus, it is possible to more effectively prevent the housing from biting into the wood. In addition, a gap may preferably be provided between the piece of wood and the housing. The gap allows the housing to bend to have bellows-like corrugations, and thus it is possible to prevent the housing from biting into the wood. The ribs may extend either outwards or inwards of the housing.

Therefore, when subjected to an axial compressive force, the housing is bent to form smaller corrugations and deformed into a bellows-like form. Thus, it is difficult for the housing to bite into the piece of wood. As a result, it is possible to achieve the maximum capacity of the piece of wood itself, and it is possible to provide an impact absorbing unit in which the compressive force is stabilized.

While embodiments of the invention are described with reference to the aspects described above, it should be understood by those skilled in the art that various substitutions, modifications and changes may occur insofar as they do not depart from the scope of the invention. Thus, embodiments of the invention can include various substitutions, modifications and changes as long as they do not depart from the spirit or scope of the appended claims. Embodiments of the invention are not limited to the particular aspect described above and can be changed as follows.

The ribs of the housing may be provided on, at least, two opposing walls. When the impact absorbing unit 111 illustrated in FIG. 11 is exemplified, the ribs may be provided on at least either pair of opposite walls (141 and 143, or 142 and 144). In addition, the horizontal cross-section of the housing, which is perpendicular to the axis, may have an oblong shape. In this case, the ribs may preferably be provided on two walls whose surface area is greater than other walls. In addition, a single impact absorbing unit may have mixed types of ribs, some ribs extending outwards as in Embodiment 3 and the others outwards as in Embodiment 4.

EXAMPLES

Two impact absorbing units of Examples 3 and 4 that have different rib shapes, and an impact absorbing unit of Reference 2 were prepared. The Example 3 impact absorbing unit was based on Embodiment 3 described above. The impact absorbing unit of Example 3 had ribs extending outwards. The Example 4 impact absorbing unit was based on Embodiment 4 described above. The impact absorbing unit of Example 4 had ribs extending inwards. In addition, an impact absorbing unit of Reference 2 was prepared for comparison. The impact absorbing unit of Reference 2 was composed of only a frame portion and no ribs were included. In the impact absorbing units of Examples 3 and 4 and Reference 2, a square timber of cedar with an external size of 39.3 square mm and an axial length of 70 mm was used for the piece of wood. In addition, the housings were formed of A5052 aluminum, and its frame portions had an internal size of 40 square mm, an axial length of 70 mm, and a thickness of 0.5 mm. Further, a piece of wood was accommodated in the housing with a gap of 0.35 mm per each side between the housing and the piece of wood. Configurations of the ribs of impact absorbing units are shown in Table 1.

TABLE 1

| | Example 3 | Example 4 | Reference 2 |
|---|---|---|---|
| Ribs | Formed | Formed | None |
| Direction of ribs | Outward | Inward | — |
| Protrusion height of ribs (in mm) | 10 | 5 | — |
| Thickness of ribs (in mm) | 0.5 | 0.5 | — |
| Height-to-thickness ratio of ribs | 20:1 | 10:1 | — |

Figure 15:
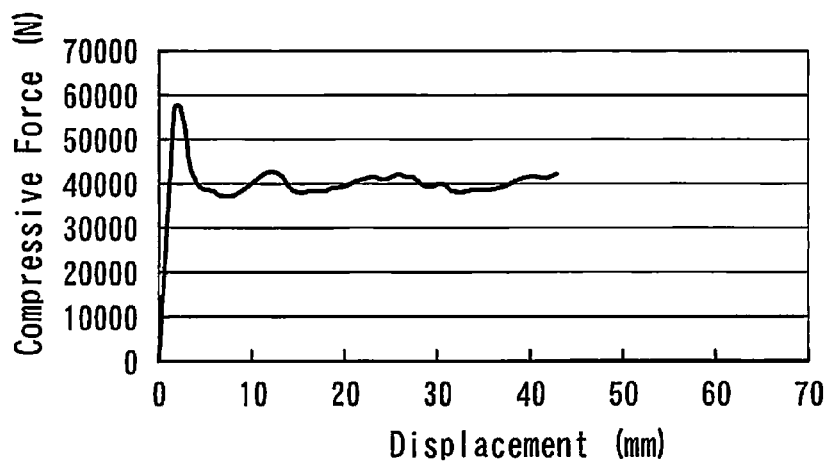
FIG. 15 is a chart showing the change of compressive force versus compressive length of an impact absorbing unit of Example 3.
Figure 16:
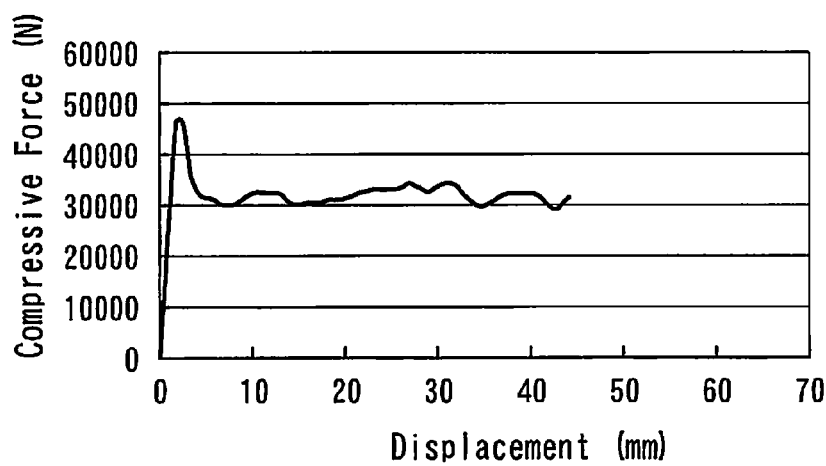
FIG. 16 is a chart showing the change of compressive force versus compressive length of an impact absorbing unit of Example 4.
Figure 17:
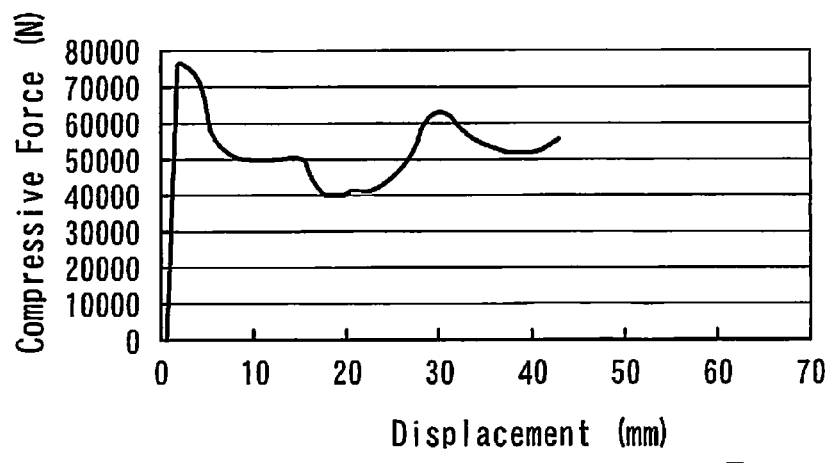
FIG. 17 is a chart showing the change of compressive force versus compressive length of an impact absorbing unit of Reference 2.
Figure 18:
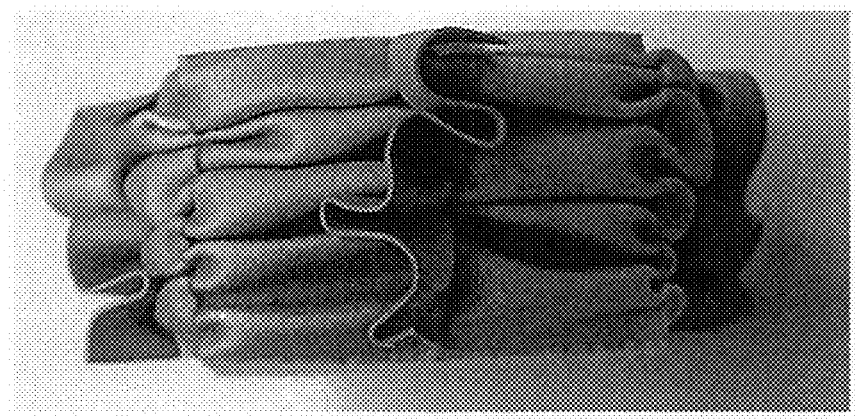
FIG. 18 is a photograph of the impact absorbing unit of Example 3, showing the appearance after compression viewed straight towards one of its walls.
Figure 19:
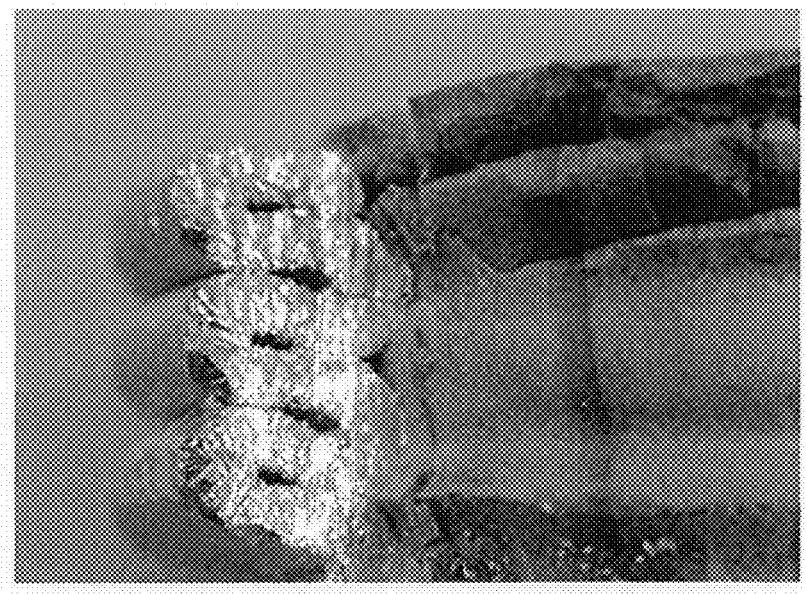
FIG. 19 is a photograph of the impact absorbing unit of Example 3, showing a cross-section after compression taken along the axis.
Figure 20:
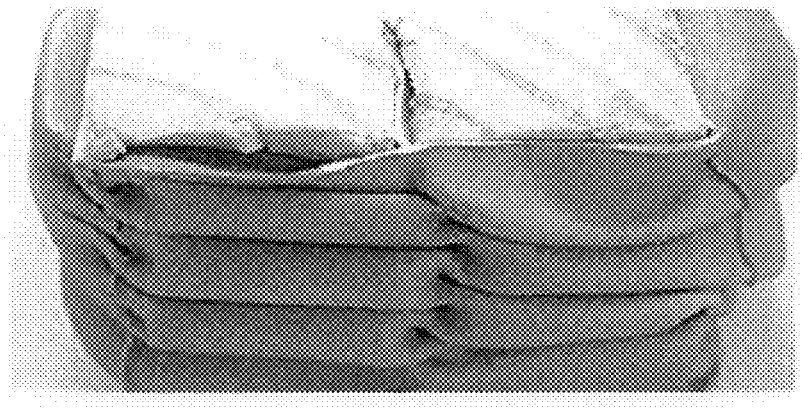
FIG. 20 is a photograph of the impact absorbing unit of Example 4, showing the appearance after compression viewed obliquely.

The impact absorbing unit of Examples 3 and 4 and Reference 2 were mounted in a compression testing machine (Autograph AG-100KNE, Shimadzu Corporation), and a relation between a compressive deformation and a compressive force was measured while an axial compressive force was applied at a compression rate of 2 mm/min. The measurement results are illustrated in FIGS. 15 to 17. The impact absorbing units in a compressed condition are shown in photographs in FIGS. 18 to 21.

Figure 21:
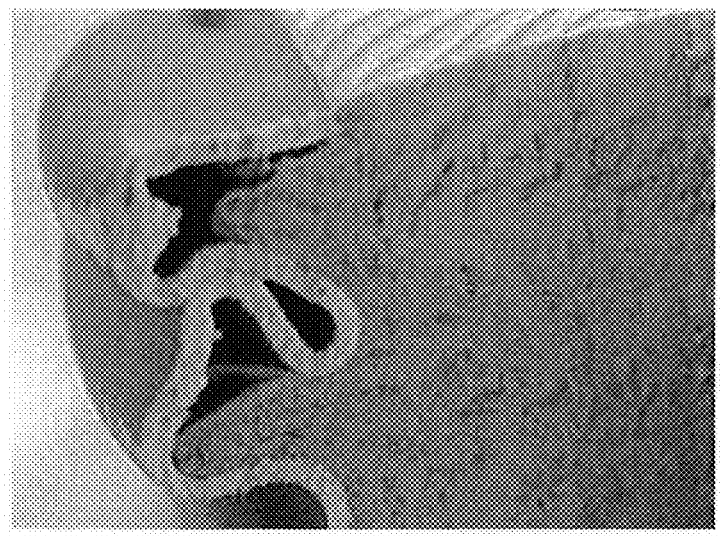
FIG. 21 is a photograph of the impact absorbing unit of Reference 2, showing a cross-section after compression taken along the axis.

Referring to the charts of FIGS. 15 to 17 which show the relation between deformation of the impact absorbing unit and the compressive force, it is clearly seen that the compressive forces increase during initial deformation, and then the compressive forces of Examples 3 and 4 with ribs provided change more linearly and stably as compared to the compressive force of Reference 2, which has no ribs provided. In terms of the deformation of the impact absorbing unit, the frame portions of the housings of Examples 3 and 4 and Reference 2 were collapsed along the axis through the bellows-like deformation, and the pieces of wood housed inside were compressed straight along the axis, without being broken. Now, the number of folds (ridges) of the corrugations formed in the frame portion will be discussed. In Reference 2, which had no ribs, three folds were formed, while in each of Examples 3 and 4, which had ribs, five folds were formed and the corrugations were finer and smaller in height than those in Reference 2. In Reference 2, which had no ribs, the ridges (and furrows) of the bellows-like corrugations were continuously formed end to end in the width of the walls (see also Reference 1 shown in FIG. 10). In contrast, in Examples 3 and 4, which had ribs, the ridges of the bellows-like form were divided at the joints of the ribs (see FIGS. 18 and 20). The ribs, on the other hand, collapsed in a way that did not follow the bellows-like deformation of the frame portion. Specifically, as best shown in the photograph of Example 3 in FIG. 18, the ribs buckled to form corrugations that deviated in a direction perpendicular to the bellows-like deformation of the frame portion. It may be considered from this result that the walls deformed to have corrugations with a lower height because with ribs, the walls of the frame portion are prevented from bending very much in the middle part, and the ribs and walls bend perpendicular to each other through interaction. In Examples 3 and 4, which had ribs, the frame portion deformed in a finer corrugations, so the housing was prevented from biting into the wood (see FIG. 19), which may have led to the stable compressive force. In contrast, in Reference 2, which had no ribs, the walls of the frame portion deformed to have corrugations that deviated greatly, so the frame portion bites into the wood, as illustrated in FIG. 21.

Next, some impact absorbing units based on Embodiment 3 described above were prepared, in which the protrusion heights were changed such that the height-to-thickness ratio of the ribs were 4:1, 5:1, 10:1, 20:1 and 22:1. The ribs had a constant thickness of 0.5 mm. The material and the size of the piece of wood and the frame portion of the housing were the same as those in Examples 3 and 4. Each impact absorbing unit was compressed under the same conditions as in the experiment described above and was observed visually and the number of folds formed in the frame portion of the housing was counted. The observation result is illustrated in FIG. 22, as a chart showing a relation between the height-to-thickness ratio in the ribs and the number of folds formed.

Figure 22:
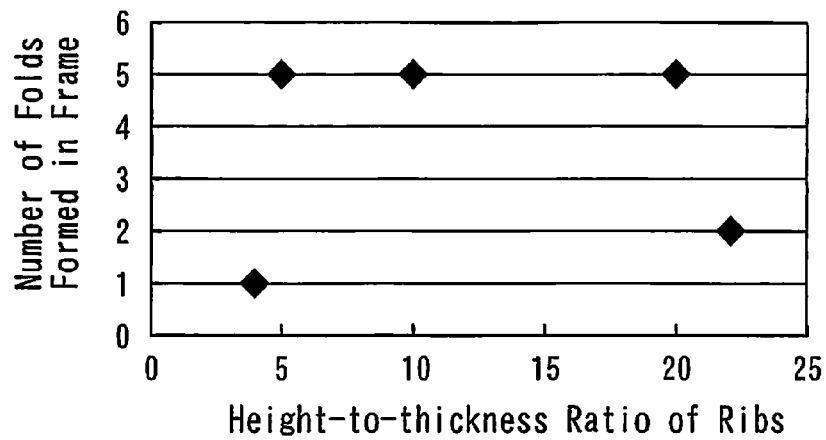
FIG. 22 is a chart showing a relation between the height-to-thickness ratio and the number of folds formed in the frame portion.

As seen from the result of FIG. 22, it is shown that more folds are formed and the frame portion deforms to have smaller corrugations when the height-to-thickness ratio of ribs is within the range of 5:1 to 20:1. When the collapsed housing was observed, the buckled ribs had corrugations that deviated in a direction perpendicular to the bellows-like deformation of the frame portion in any case in which the height-to-thickness ratio of the ribs was 5:1, 10:1 or 20:1. In contrast, it is also shown that fewer folds are formed when the height-to-thickness ratio of the ribs is 4:1. When the collapsed housing is observed, it seemed that the ribs had deformed following the wavy deformation of the walls of the frame portion. Further, it is also shown that more folds are formed when the height-to-thickness ratio of the ribs is 22:1. When the collapsed housing was observed, it seemed that the ribs had been pulled into the walls during deformation. Based on these observations, the height-to-thickness ratio of the ribs may preferably be within the range of 5:1 to 20:1 to ensure that the frame portion deforms to have smaller corrugations, preventing the frame portion from biting into the wood.

In further experiment, the relation between the height-to-thickness ratio of the ribs and the number of folds formed in the frame portion was examined. The ribs had a constant thickness of 1 mm and the height-to-thickness ratio of the ribs was varied by changing the protrusion height, and the same method used in the experiment described above was used. The result showed a similar behavior to that in the case that the thickness of the ribs was 0.5 mm.

Next, in the impact absorbing units of Example 4 which were used in the experiments described above, the protrusion heights of the ribs were varied so that the height-to-thickness ratio of the ribs were 4:1, 5:1, and 20:1. Each impact absorbing unit was compressed under the same conditions as that in the experiment described above.

Figure 23:
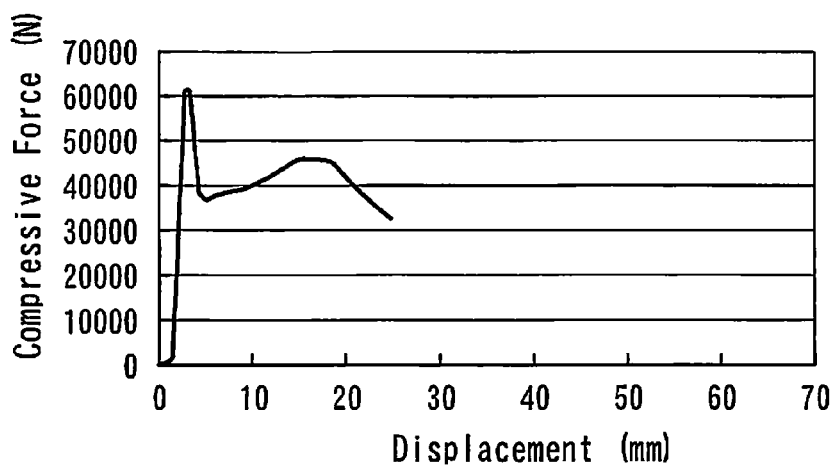
FIG. 23 is a chart showing the change of compressive force versus compressive length of an impact absorbing unit with a height-to-thickness ratio of 4:1.
Figure 24:
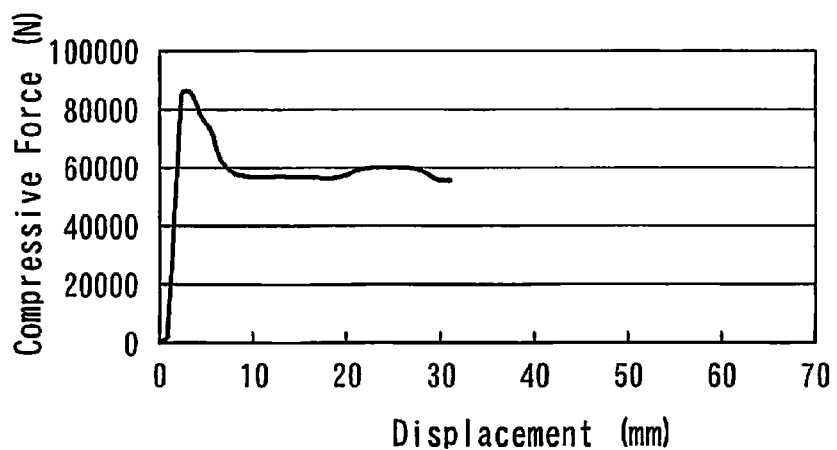
FIG. 24 is a chart showing the change of compressive force versus compressive length of an impact absorbing unit with a height-to-thickness ratio of 5:1.

As a result, when the height-to-thickness ratio of the ribs was 4:1, the ribs were corrugated following the bellows-like deformation of the frame portion. The chart of FIG. 23 illustrates the relation between the compressive deformation and the compressive force, which shows that the compressive force fluctuated greatly after the rise at the initial deformation. In contrast, when the height-to-thickness ratio of the ribs was 5:1, the ridges (and furrows) of the corrugations in the frame portion was divided at the joint of the ribs, and the frame portion deformed to have finer corrugations, in the same way as similar to Example 4 in which the height-to-thickness ratio of the ribs was 10:1. The chart in FIG. 24 illustrates the relation between the deformation and the compressive force, which shows that the compressive force rises at the initial deformation and then progresses linearly. Further, when the height-to-thickness ratio of the ribs was 20:1, the ridges (and furrows) of the corrugations in the frame portion were also divided at the ribs. Also, the frame portion deformed to have finer corrugations, it was observed that the compressive force rose at the initial deformation, and then the compressive force progressed linearly. Based on these results, it is clearly shown that the inwardly extending ribs can also effectively prevent the frame portion from biting into the piece of wood when the height-to-thickness ratio of the ribs is within the range of 5:1 to 20:1, since the frame portion deforms to have finer corrugations. This will stabilise the variation of the compressive force after the compressive force rises at the initial deformation.

The invention claimed is:

1. An impact absorbing unit for a vehicle which is subjected to an axial compressive force from an impact in the event of a collision, comprising:
a columnar piece of wood being shaped in a square column and having an axis that extends along a grain direction; and
an open-ended square tubular metallic housing covering lateral faces of the piece of wood, wherein the metallic housing has ribs protruding at right angles from at least a pair of opposite walls of the housing, wherein the ribs longitudinally extend over the entire length of the housing parallel to the axis of the piece of wood, and wherein the ribs have a protrusion height to thickness ratio within a range of 5:1 to 20:1.

2. The impact absorbing unit for a vehicle according to claim 1, wherein the piece of wood and the housing have a gap therebetween.

3. The impact absorbing unit for a vehicle according to claim 1, wherein the ribs extend outwards from the walls of the housing.

4. The impact absorbing unit for a vehicle according to claim 1, wherein the ribs extend inwards from the walls of the housing.

5. The impact absorbing unit for a vehicle according to claim 1, wherein each of the ribs is located in a widthwise middle portion of each of the walls of the housing.

* * * * *